United States Patent [19]
Foster et al.

[11] Patent Number: 6,044,798
[45] Date of Patent: Apr. 4, 2000

[54] FLOATING AQUACULTURE APPARATUS

[75] Inventors: James P. Foster, Avondale, Pa.; Jon Locke, Half Moon Bay, Calif.

[73] Assignee: Princeton Abalone Inc., Half Moon Bay, Calif.

[21] Appl. No.: 09/013,313

[22] Filed: Jan. 26, 1998

[51] Int. Cl.[7] ................................................. A01K 61/00
[52] U.S. Cl. ........................... 119/240; 119/239; 119/223
[58] Field of Search .................................. 119/223, 238, 119/239, 240, 241, 207, 208, 209, 221, 222, 234, 244, 215

[56] References Cited

U.S. PATENT DOCUMENTS

| | | | |
|---|---|---|---|
| 4,170,196 | 10/1979 | Yoneya | 119/223 |
| 4,182,270 | 1/1980 | Fourcher | 119/238 |
| 4,183,322 | 1/1980 | Shultz et al. | 119/236 |
| 4,226,210 | 10/1980 | Lockwood et al. | 119/236 |
| 4,253,418 | 3/1981 | Lockwood et al. | 119/236 |
| 4,261,671 | 4/1981 | Langner | 405/166 |
| 4,320,717 | 3/1982 | Rowley | 119/241 |
| 4,395,970 | 8/1983 | Kunkle et al. | 119/240 |
| 4,508,057 | 4/1985 | Suzuki | 119/221 |
| 4,712,509 | 12/1987 | Vangen | 119/223 |
| 4,876,985 | 10/1989 | Marcum et al. | 119/240 |
| 5,213,058 | 5/1993 | Parker et al. | 119/208 |
| 5,377,624 | 1/1995 | Craig et al. | 119/234 |
| 5,400,745 | 3/1995 | Saxby et al. | 119/239 |
| 5,429,074 | 7/1995 | Nelson et al. | 119/239 |
| 5,653,193 | 8/1997 | Marissal | 119/240 |
| 5,769,027 | 6/1998 | Adams et al. | 119/238 |

FOREIGN PATENT DOCUMENTS

| | | | |
|---|---|---|---|
| 11516 | 2/1928 | Australia | 119/240 |
| 137087 | 4/1985 | European Pat. Off. | 119/239 |
| 405103560 | 4/1993 | Japan | 119/223 |
| 1329714 | 8/1987 | U.S.S.R. | 119/223 |

*Primary Examiner*—Michael J. Carone
*Assistant Examiner*—James S. Bergin
*Attorney, Agent, or Firm*—Jeffrey C. Lew

[57] ABSTRACT

A modular apparatus for cultivating marine animals caged within rearing units submerged in a body of water of the natural environment of the animals includes a row and column structure that floats at the water surface. The apparatus is moored by anchors deployed at the column ends and at position intermediate the column ends. The members of the rows, and optionally the columns, are constructed from substantially rigid tubes, especially plastic, corrugated wall, culvert pipe, filled with a substantially incompressible foam. The row members are releasably attached between adjacent columns in perpendicular orientation to the longitudinal axes of the columns.

Each rearing unit is a perforated wall container suspended from a row member by a suspension assembly so as to hang above the water floor. Multiple rearing units can be suspended from each row member. The rearing units contain vertically oriented panels of substrate material, especially sheets of cementitious backer unit.

Whole modules including a row member, the suspension assemblies and rearing units suspended thereby from the row member can be deployed and removed from the apparatus as a unit to facilitate the simultaneous cultivation of large numbers of marine animals in segregated compartments. The modular apparatus is particularly useful for growing juvenile abalone in captivity.

37 Claims, 11 Drawing Sheets

FLOATING AQUACULTURE APPARATUS

FIELD OF THE INVENTION

This invention relates to an apparatus for farming marine animals. More specifically, it relates to a floating aquaculture apparatus for cultivating juvenile gastropod shellfish through maturity for commercial harvesting.

BACKGROUND AND SUMMARY OF THE INVENTION

For a variety of reasons the populations of many species of wild gastropod shellfish have diminished considerably over the last few decades. This applies especially to *Haliotis rufescens*, a species of abalone which historically thrived in the ocean off the coast of California. The demand for abalone as an edible delicacy primarily in the Far East continues to increase beyond the natural supply. This high demand and low supply situation has made the commercial farming of domesticated abalone economically attractive. Recently, abalone farming as well as aquaculture of a growing number of gastropod and non-gastropod marine animal species has developed into an industry of ever increasing commercial importance.

A stage of the abalone life cycle which significantly impacts the commercial viability of farming is the growth of the juveniles from a size of about 0.64–1.3 cm (0.25–0.5 in.) to maturity, i.e., about 7.6–10.2 cm (3–4 in.). Certain aspects of the care of abalone have made the maturation process difficult to implement in a commercial setting. For example, abalone's desire and ability to consume food changes with size during maturation. Consequently, the stock usually should be sorted as to size frequently to assure that all animals have optimum access to food. Also, the animals should live in a habitat favorable for growth similar to their natural environment. Some typically desirable habitat characteristics include adequately oxygenated, clean, pathogen-free, sea water, an ample supply of the preferred food, which is kelp, and a rock-like environmental surface on which the gastropods can cling as they forage.

Certain equipment has been developed to facilitate the growth of juvenile abalone. U.S. Pat. No. 4,320,717 of Rowley discloses an apparatus for growing sea life which uses multiple habitat modules vertically stacked on a support which rests on the sea floor. The apparatus further includes a system of feed risers such that each feed riser is adapted to feed a single module in the stack. Thus the disclosure appears to relate to an undersea captive habitat for growing abalone in segregated modules wherein the type of feed piped to each module can be controlled easily. The patented apparatus allows a module to be lowered onto the stack in any random order with assurance that the appropriate feed source will be connected to the module. However, the disclosed apparatus suffers from a significant drawback in that the modules are stacked. To retrieve a module positioned low in the stack for purposes of cleaning, repairing or harvesting the module or for any other reason, all higher modules must be removed first. This would seem to add to the labor and cost of servicing the apparatus disclosed in U.S. Pat. No. 4,320,717.

U.S. Pat. No. 5,377,624 of Craig et al. discloses a land-based abalone farming system. The patent refers to prior art grow-out tanks that typically were large rectangular seawater catch basins located outdoors. These grow-out tanks occupied much land. The '624 patent purportedly describes grow-out tanks with much better space utilization. The patented abalone farming system comprises a grow-out area that includes a set of vertically stacked, horizontally elongated tanks. The stack of tanks is connected to a seawater source and an outlet is provided for discharging spent seawater. A recirculation system permits discharged seawater to be selectively reclaimed at the outlet and fed back to the water supply. Land-based aquaculture facilities offer a high degree of convenience with respect to servicing the growing animals. Unfortunately, this convenience is frequently more than off set by the complicated and expensive equipment which must be operated to maintain a simulated natural environment for sea animals on a land-based site.

It is very desirable to have a robust, durable aquaculture apparatus which can be deployed at sea and which provides convenience for the care and protection of the cultured animals. It is also desirable to have an inexpensive aquaculture apparatus made from simple, low cost materials. An apparatus that is especially well suited to the aquaculture of juvenile abalone to harvesting at maturity has been discovered. Among other beneficial features, the novel apparatus especially provides durability; the ability to be made from commonly available inexpensive materials; flexibility to expand and contract production scale through modular construction; the ability to be deployed at sea in the animals' native environment; stability in turbulent ocean conditions; minimal visual impact on the seascape; easy accessibility to the growing animals at all stages of development for feeding, cleaning, sorting and harvesting; and the capability to easily modify the scale of operation.

Accordingly, there is now provided a floating aquaculture apparatus for deployment in a body of water comprising (a) a plurality of substantially parallel columns;

(b) a plurality of elongated modules between adjacent columns spaced apart longitudinally along the columns and oriented substantially perpendicular thereto, each module including:
  (1) a buoyant elongated row member having a member length and being releasably attached at each of two ends to the adjacent columns; and
  (2) at least one negatively-buoyant rearing unit adapted to contain marine animals, the rearing unit being suspended from the row member above the waterfloor, wherein the buoyancy of the elongated row member is effective to neutralize the negative-buoyancy of all rearing units suspended therefrom; and (c) means for anchoring the apparatus to the waterfloor.

There is also provided a method of growing in captivity marine animals, and especially abalone which employs the floating aquaculture apparatus recited above.

BRIEF DESCRIPTION OF THE DRAWINGS

FIG. 2 is a top plan view of the embodiment of the floating aquaculture apparatus of FIG. 1a.

DETAILED DESCRIPTION

The floating aquaculture apparatus is deployed in a body of water. For cultivating native saltwater marine animals, the apparatus can be located at sea. It also can be used for fresh water animals and thus may just as well be placed in a natural or artificial lake, pond, river, stream, pool or other suitable body of water.

Figure 1:
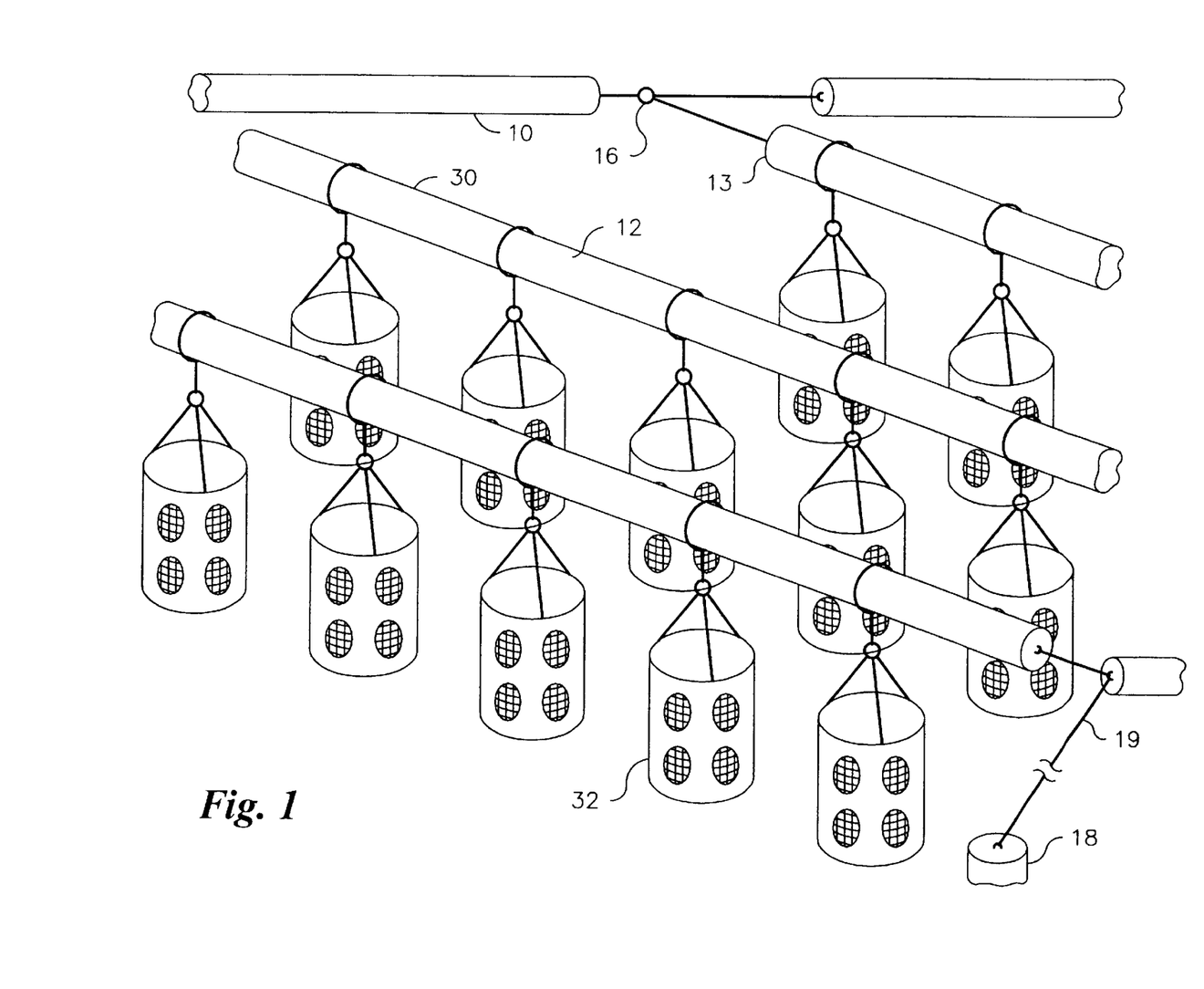
FIG. 1 is a partial perspective view of a preferred embodiment of the floating aquaculture apparatus according to this invention.
Figure 2:
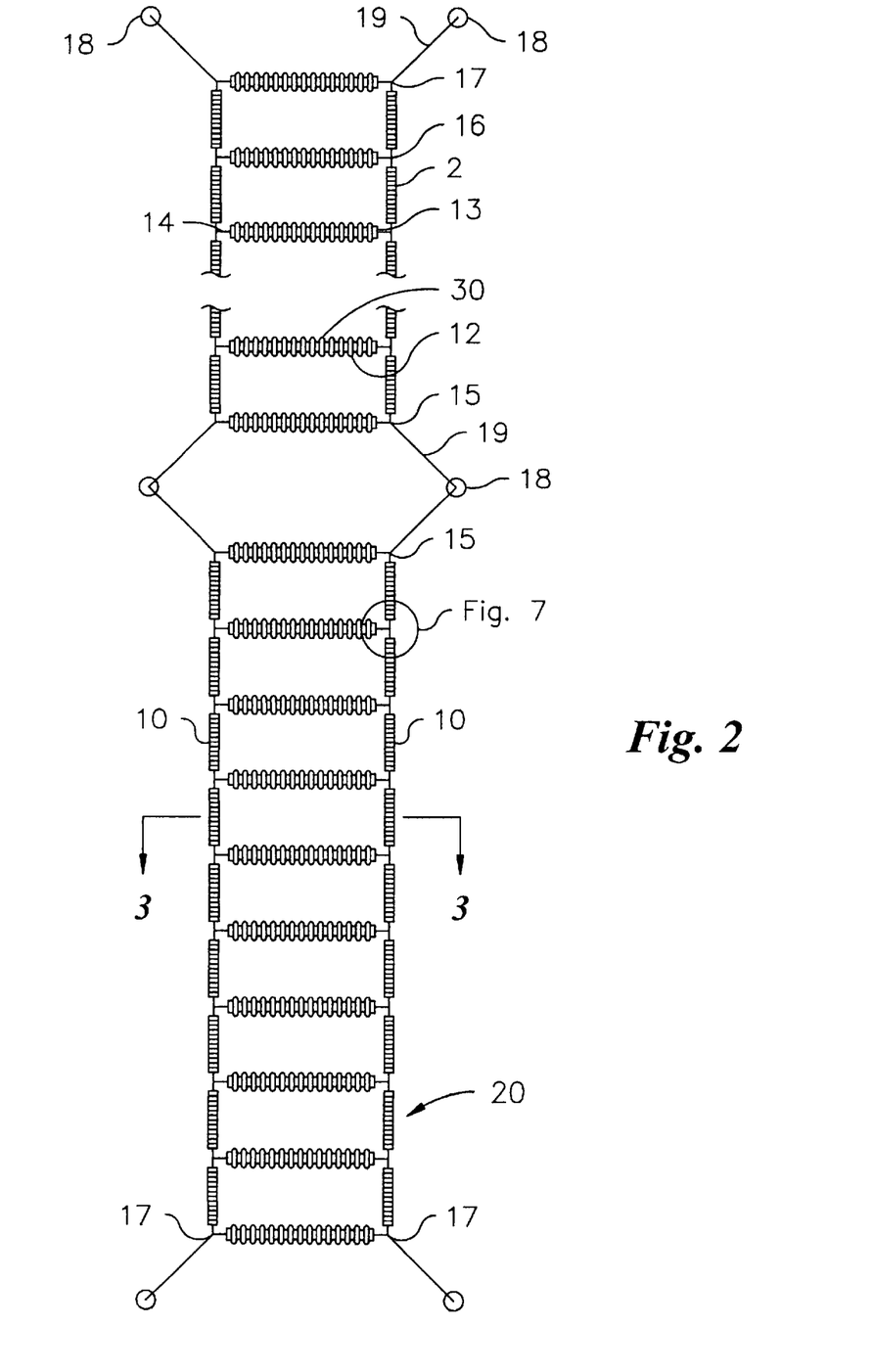
Figure 3:
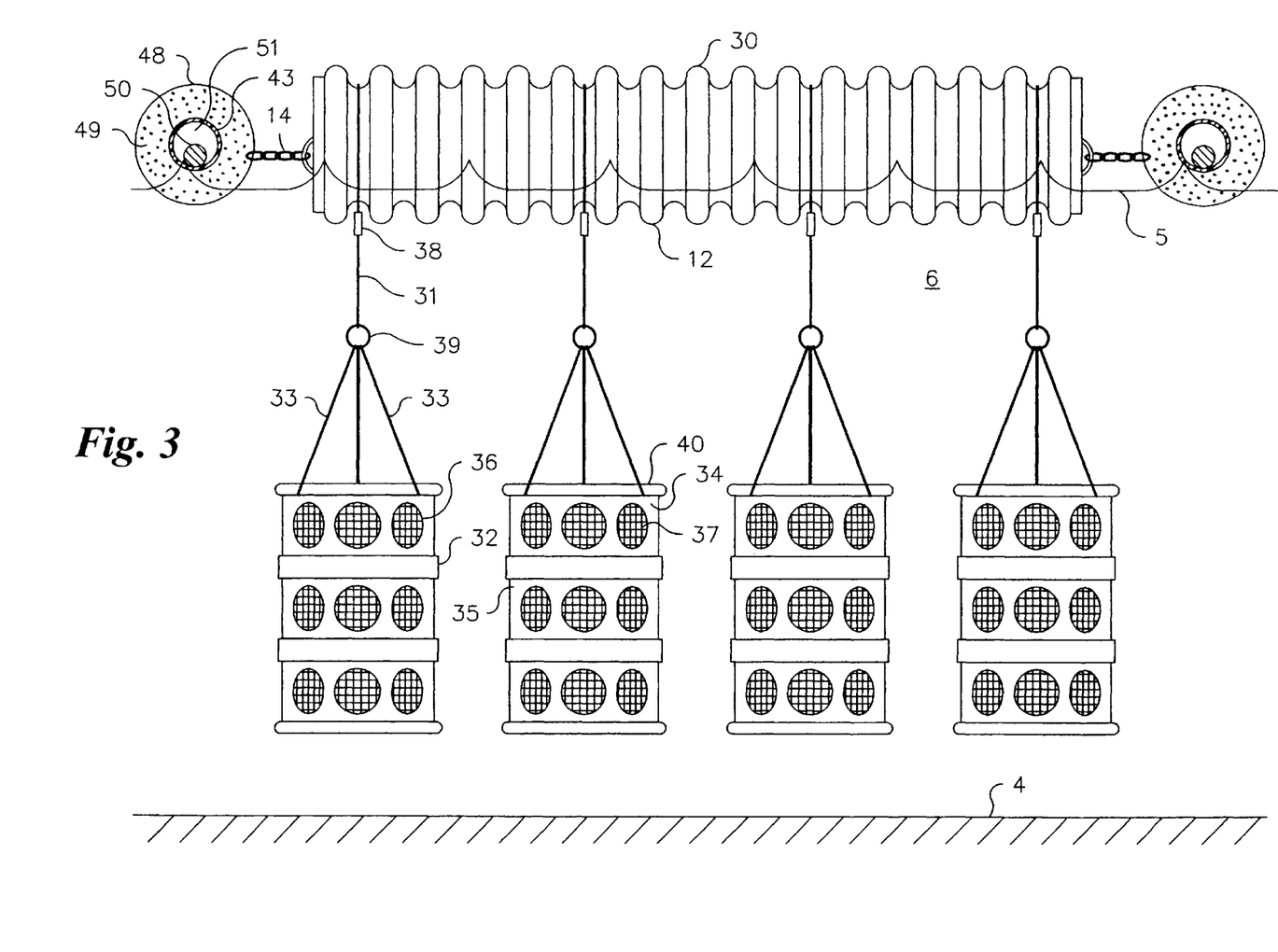
FIG. 3 is a partial elevation view of the floating aquaculture apparatus as viewed from line 3—3 in FIG. 2.

With reference to FIGS. 1–3, it is seen that the apparatus generally has a row-and-column network structure 20 which floats horizontally at the surface 5 of the water 6. In simplest form the network has a ladder-like appearance. The legs of the ladder are long columns 10 of members strung under tension. The rungs of the ladder are elongated modules 30 (FIG. 3). Each module comprises a row member 12, at least one suspension assembly and a negatively buoyant rearing unit 32 connected to the row member by each suspension assembly. The suspended rearing units hold the growing animals below the water surface above the waterfloor 4. A plurality of rearing units can be suspended from each row member. Row members 12 are about the same length and are connected between columns 10 and oriented substantially perpendicular to the longitudinal axes of the columns. Elongated modules 30 are spaced at intervals along the length of the columns. The row members are buoyant and are connected at their ends 13 to columns 10 by row links 14.

The network is maintained in position relative to the waterfloor by anchors. At least two, substantially parallel columns 10 are maintained in tension mode between anchor means 18 disposed at the column end positions 17. Optional anchor means also can be placed intermediate the column ends, for example at intermediate column positions 15 shown in FIG. 2. The number of intermediate column anchor positions will depend on the overall length of the columns and can be more than one that is shown in the illustrated embodiment. Generally, the longer the columns and greater the number of rows, the larger number of intermediate column anchor positions should be used. Preferably, the number of rows between anchor positions should be in the range of about 5–12.

The anchor means are connected to the columns by rodes 19 such as cable, wire, rope and chain. Chain is preferred. The specific nature of the anchor means is not critical except that the selected type of anchor should be adapted to hold firmly to the ground where the anchor is placed. The well known principles of anchoring in the nautical art for anchoring vessels and buoys apply to the deployment of the aquaculture apparatus. Hence, mushroom anchors, weighted objects, plows and auger-style anchors are representative of anchors suitable for soft to medium-hard ground and a fluked, grappling-style anchor exemplifies anchors acceptable for hard ground. The anchors should be placed at a distance from the point of connection to the columns effective to provide scope, i.e., length of the anchor rodes, for good holding power and to allow sufficient slack to accommodate change of water depth due to tidal surging. The scope will depend upon the method of anchoring in that anchors permanently attached to the waterfloor can employ shorter scope than temporary anchors. Preferably, scope should be at least about three times the mean water depth, more preferably at least about five times the mean water depth, and most preferably, at least about 7 times the mean water depth.

The columns can be assembled from lengths of rigid members such as metal rods or bars, or flexible members such as wire, cable or chain. If the column material is not inherently buoyant, buoys can be placed at least at the column ends and at the intermediate column positions to provide near neutral buoyancy of the columns. Optional additional floats also can be deployed along the column lengths. FIG. 2 illustrates a preferred embodiment having a number of buoyant elongated column members 2 connected head-to-tail to form the substantially parallel columns 10. The column members are generally of rigid construction described in greater detail, below. These column members are held in columnar configuration by column links 16.

Figure 9:
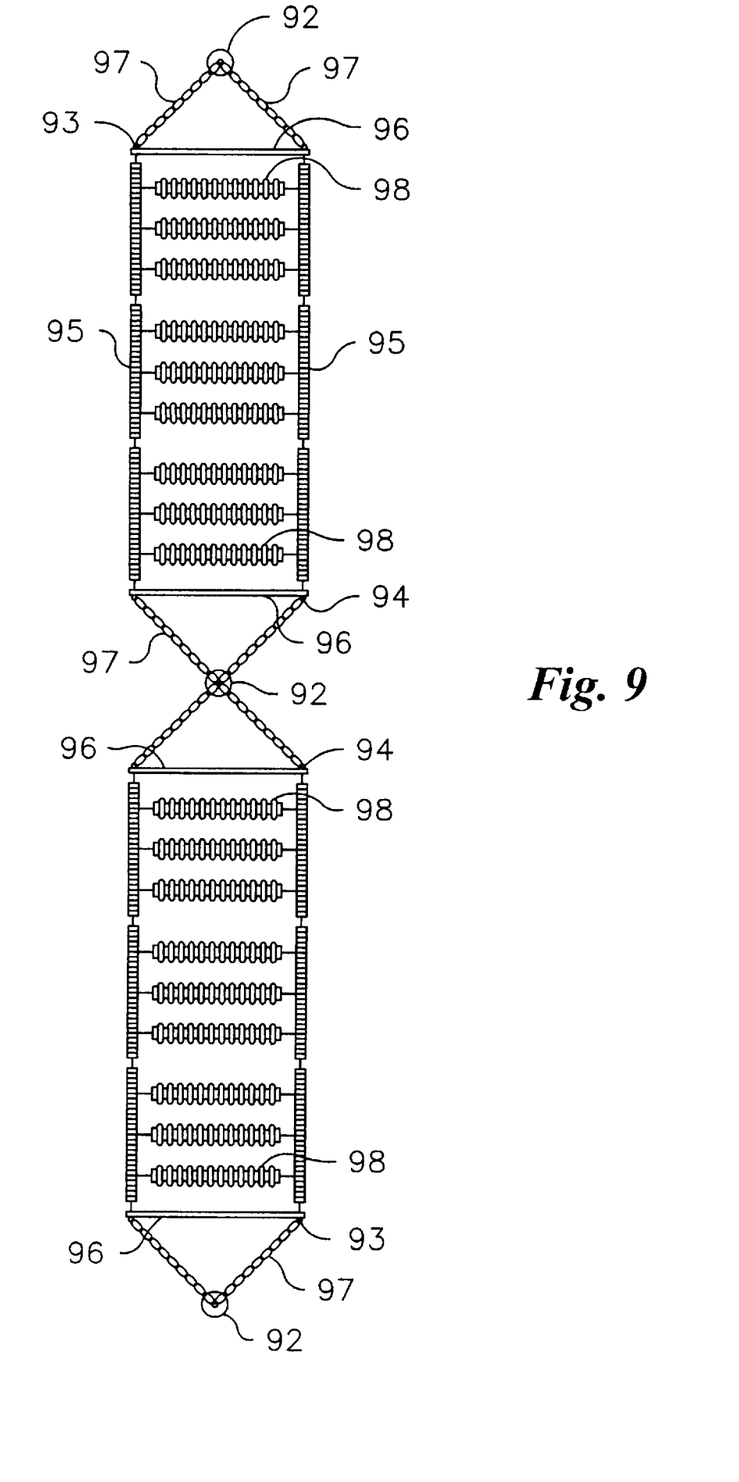
FIG. 9 is a top view of another preferred embodiment of the floating aquaculture apparatus having single anchors at the column ends as depicted in FIG. 14.

Another preferred arrangement for the row and column structure is shown diagrammatically in FIG. 9. The parallel columns 95 are kept apart by end bars 96. The bars provide at least two benefits. Firstly, they allow for reducing the number of anchors at end and intermediate column positions by 50% compared to the arrangement shown in FIG. 2. Thus, a single anchor 92 connected by rodes 97 at each of the column end positions 93 and intermediate column positions 94 is sufficient to deploy the floating aquaculture apparatus. Secondly, the end bars hold the parallel columns 95 apart so that end most elongated modules 98 can be hoisted from the network for service without drawing the columns toward each other. The end bars can be constructed of any material that is durable and supports a compressive load. It is not critical that the end bars float. Representative materials for end bars include wooden beams, logs and railroad ties; solid metal rods, bars and beams; and hollow metal or plastic tubes and pipes. The interior of a hollow end bar need not be sealed off from the water, however, it is preferred to close the ends of the end bars with water tight caps.

Figure 14:
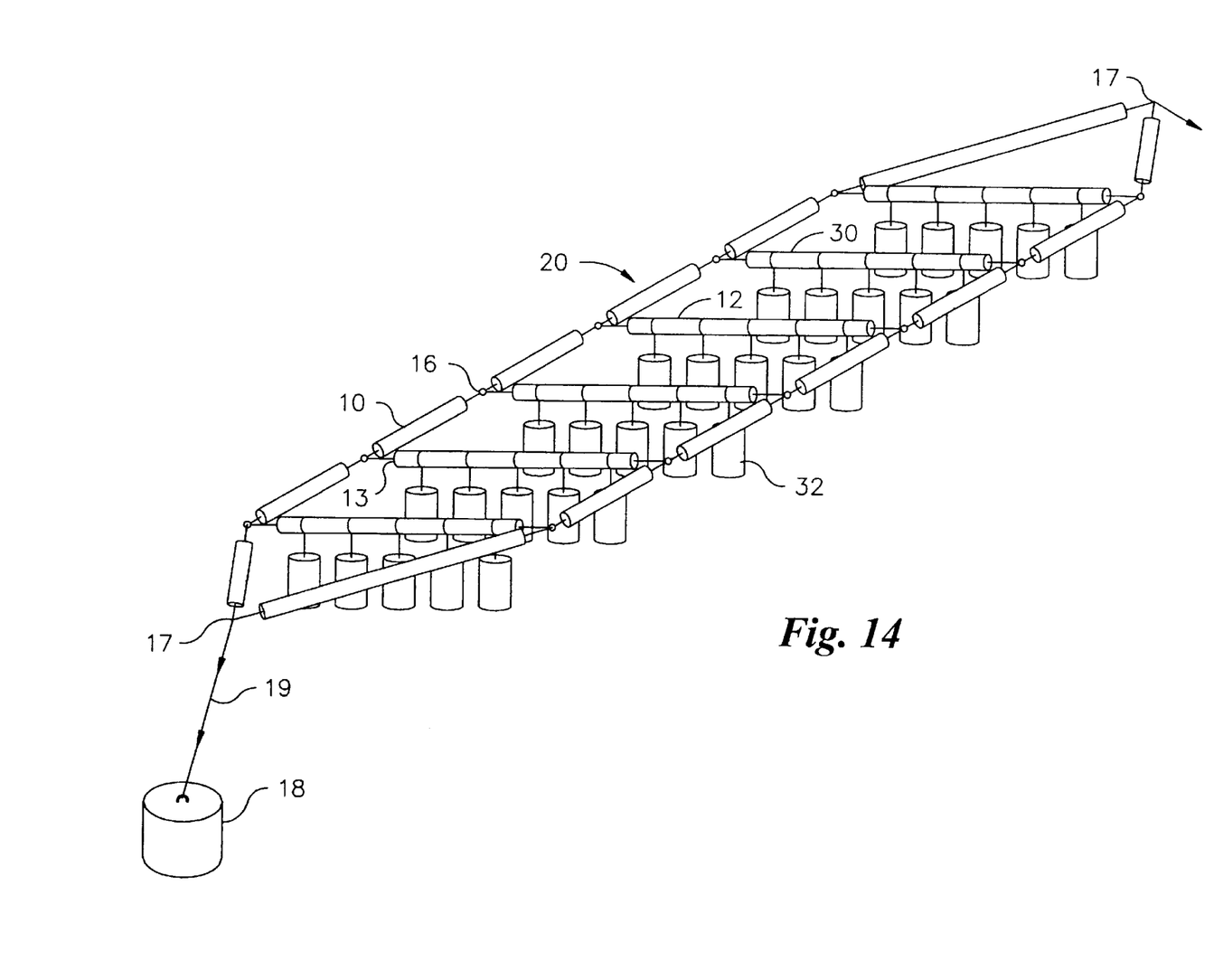
FIG. 14 is a partial perspective view of another embodiment of the floating aquaculture apparatus according to this invention.

Another embodiment of the novel floating aquaculture apparatus having a single anchor at the column ends is shown in FIG. 14.

Figure 10:
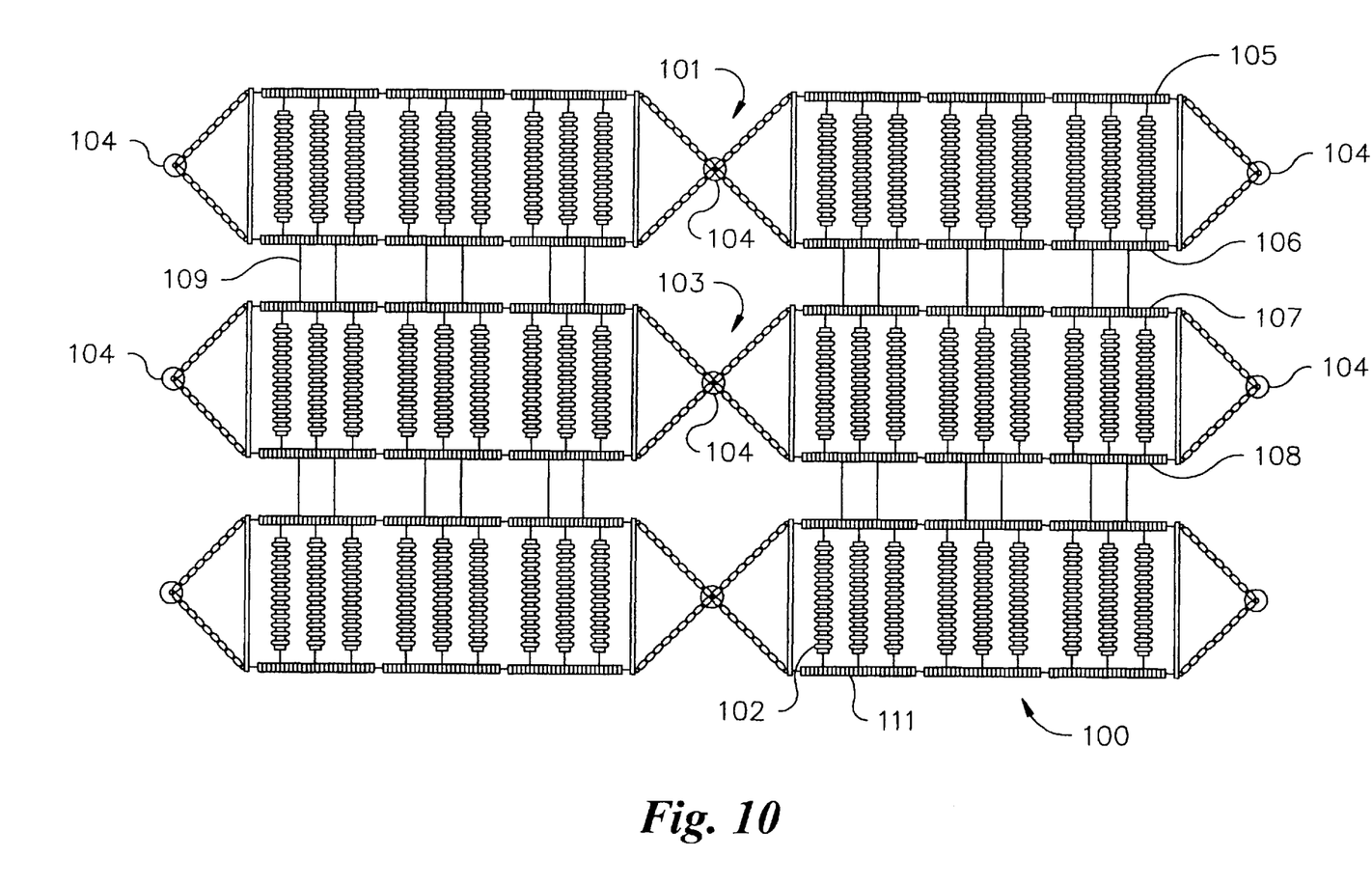
FIG. 10 is a top view of another preferred embodiment of the floating aquaculture apparatus according to this invention.

In still another embodiment of this invention a matrix 100 of aquaculture modules 102 can be assembled as shown in FIG. 10 to maximize the density of cultivation in a preselected area. The matrix comprises a network of row and columns. For example, row and column unit 101 defined by substantially parallel columns 105 and 106 as well as row and column unit 103 defined by substantially parallel columns 107 and 108 are each anchored at end column positions and intermediate column positions by anchors 104. Additionally, a plurality of intercolumn links 109 connect neighboring columns 106 and 107 of adjacent row and column units 101 and 103. The intercolumn links can be simple tension members, that is chain, cable, rope and the like, or they can include compression members such as metal pipe, rigid bars and foam-filled corrugated wall culvert pipe described in greater detail, below. FIG. 10 is not intended to be limiting with respect to the number of intercolumn links 109 between neighboring row and column units, the number of rows in a row and column unit, or the number of row and column units in the matrix.

FIG. 3 shows a preferred embodiment of a module 30 for use in this invention. Suspended from row member 12, the module has multiple rearing units 32 adapted to contain the marine animals during cultivation. Each rearing unit includes a robust cage 34, of preferably rigid construction. The walls 35 of the cage have openings 36 for the purpose of transferring water inside the cage water to and from the ambient environment outside the cage. The openings can be formed by any well known methods, such as by perforating or drilling holes in the walls and by optionally adhering mesh 37 over cut out sections of the walls. The overall open area of the openings should be large to maximize the exchange of water inside the cage, however, individual openings should not be so great as to allow animals to escape, or to allow predators to enter therethrough. The open area also should not be so great as to render the cage structure flimsy. Openings can be placed in the bottom wall of the cage to permit feces, excess food and other detritus to drop out of the cage. Thus it can be appreciated that the size of openings of one cage can be the same or different from other cages and that the opening size of a particular cage can be selected to match the size of the stock cultivated therein. Furthermore, the size of each cage can be the same or different from that of other cages of the apparatus and should be selected appropriately in relation to the size of the animals grown in the cage.

The construction of the suspension assembly is not critical. Any means for hanging the rearing units from the row members will be acceptable provided that the hanging means is strong enough to hoist the rearing unit clear of the water, as will be explained below, and is sufficiently durable to withstand submergence for weeks and repeated hoisting without need for repair. A preferred suspension assembly for connecting rearing units 32 to the row member 12 includes a strap 31 that overlies the row member and secures to an eye 39. Each suspension assembly further includes lines 33 to connect the rearing unit to the eye. The strap and lines can be of any suitably strong and pliant flexible material such as rope, ribbon, tape, wire, cable, chain and combinations thereof Preferably, the strap is rope and a cinch fitting 38 is provided to fasten the rope to itself to form a loop that conforms closely to the circumference of the row member 12. The rope lengths between the cinch fitting 38 and the eye 39 can be spliced together, overwrapped or otherwise joined together. In other preferred arrangements, chain can be substituted for rope of either one or both of the loop portion or the portion between cinch fitting and eye. Metal is preferred for the eye, however, any suitably durable, non-chafing material of construction such as a plastic can be used. The eye shown is circular but this shape is not critical. A tear drop shaped thimble spliced into a rope strap is preferred.

As will be readily appreciated, the cages 34 of can be quite heavy and will swing about their suspensions under the influence of wind, waves, current, tidal motion, nearby watercraft propeller wash and other sources of turbulence. Occasionally, neighboring cages may bump into each other with forceful contact. The cage structure should be sufficiently structurally sound and impact resistant to withstand such harsh treatment. Cages can be fabricated from thick walled metal containers, including, drums, barrels and custom shaped containers. However, such metal containers are less preferred because of their very heavy weight and because they tend to darken the meat of the gastropod cultivated therein. Preference is given to use of plastic drums, and more preferably, food grade-approved, polypropylene cylindrical drums. These are quite light weight yet strong and non-corroding in seawater. Holes can be cut into these plastic drums quite easily to provide openings for water transfer. Metal or plastic mesh can be attached to drums by hot melt adhesive welding to cover large openings so as to prevent the smaller, young gastropods from escaping and to protect against the intrusion of predators. Polypropylene mesh is preferred.

Rope is preferred for the lines connecting the cages to the eye, especially when plastic drums are employed for the cages. The ropes can be attached by threading the lines through pre-drilled, small diameter holes in the wall 35 near the top of the cage. A stop knot tied near the end of the rope inside the cage prevents the rope from pulling through the hole. A washer optionally can be added between the interior wall of the cage and the stop knot for further security. The end of each line extending out from the pre-drilled hole is tied or shackled to the eye. Although the rearing unit may be suspended by as little as a single line, preferably a plurality of lines and more preferably about 3–4 should be used to connect each rearing unit to the eye. One of ordinary skill in the art will readily appreciate that numerous additional methods of attaching the rearing unit to the row member are available and are contemplated to come within the scope of this invention.

The rearing units also feature at least one hatch 40 to provide access to the contents of the cage. Access is desirable to charge food to the unit, to remove waste and clean the inside of the cage, and to add or remove animals during seeding, sorting and harvesting steps of cultivation. Accordingly, an amply sized access hatch is preferred. The hatch optionally can include locking means for securing the hatch closed to prevent loss through accident, predation, or vandalism. As will be explained, below, the rearing units of the novel apparatus can be removed from the water temporarily for servicing. Consequently, it is preferred to place the hatch on the top surface of the cage, although the hatch can be placed at any convenient location on the cage. In the preferred embodiment wherein the cage consists essentially of a drum, the lid of the drum can serve as the hatch. Representative methods of connecting the lid to the drum include clamping the rim of the lid to the sides of the drum and engaging the rim into screw threads provided in the drum for that purpose.

Gastropods generally, and growing juvenile abalone in particular, are known to favor a hard surface on which they settle and move about on their foot to forage. Thus the rearing units further include a substrate material to support the animals. Many types of rock-like composition substrate material such as natural rock, ceramic tile, concrete forms, fiberglass, and plastic or wood sheets can be used. Most materials known for use as substrate in gastropod cultivation suffer from the drawbacks of being too dense, very expensive, or not sufficiently water-resistant or structurally durable. A new material for use as a gastropod substrate in the floating aquaculture apparatus of this invention which overcomes the aforementioned problems of conventional materials has been discovered. It has been found that sheet of cementitious backer unit is an ideal substrate for gastropod cultivation. Cementitious backer unit is a "sheet rock" building wall construction material of cement sheet and reinforced with fiberglass mesh. It was developed to underlay ceramic tiles primarily in kitchens and baths. The cementitious backer unit is sold under various tradenames such as Hard Board, DuroRock and WonderBoard the latter of which is available from Custom Building Products, Inc. which distributes through Home Depot retail stores, among others.

Cementitious backer unit is light weight, easy to cut to size with a knife edge and is relatively smooth and flat, which gastropods prefer. Although cementitious backer unit is formulated to be resistant to moisture from water splashed onto the face of ceramic tiles, it is a complete surprise that this material retains its structural integrity when totally submerged in seawater for extended periods of time. Moreover, this material endures the stresses imposed by the animals crawling on its surface and abalone thrive on it. Hence, a very important aspect of the present invention is the use of cementitious backer unit as the preferred substrate in the rearing units.

Figure 4:
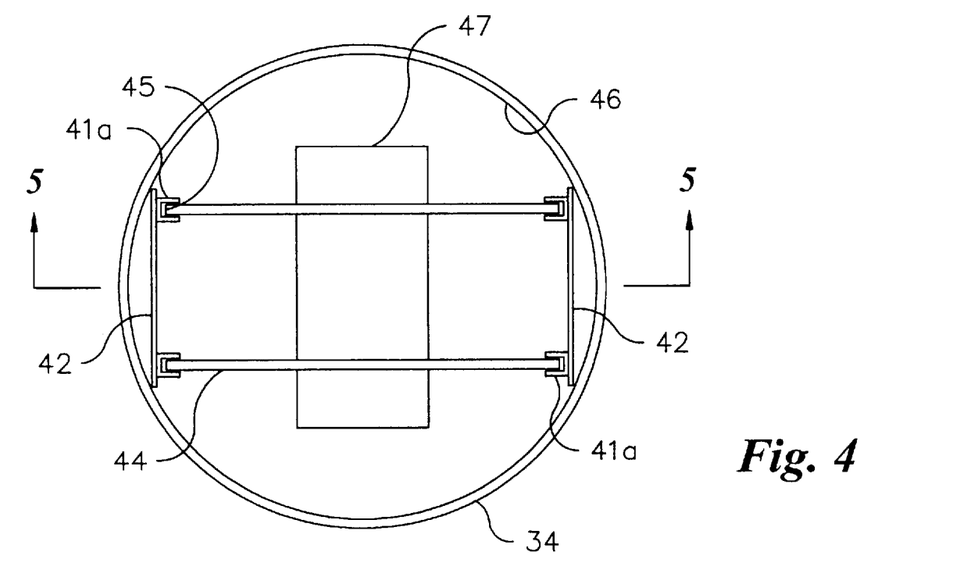
FIG. 4 is a top view of a preferred embodiment of a rearing unit according to the present invention.
Figure 5:
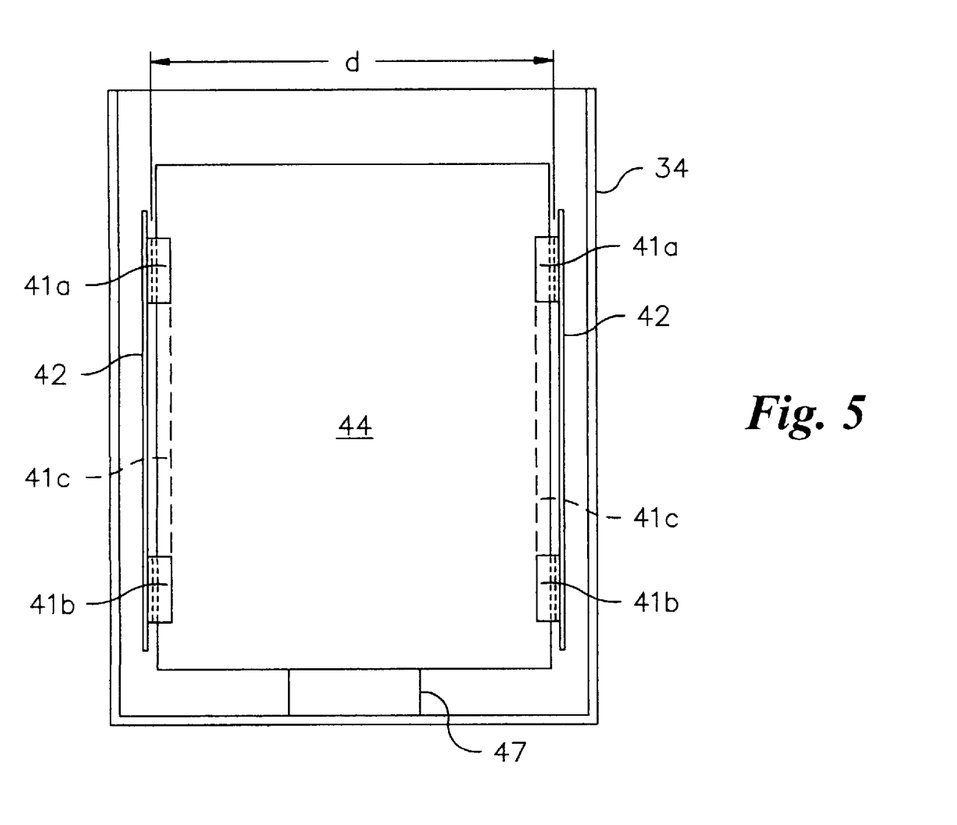
FIG. 5 is a section view of the rearing unit of FIG. 4 taken along line 5—5.

Substrate material is installed preferably vertically in the rearing units. A preferred method of installation shown in FIGS. 4 and 5 involves fixing a pair of flat plates 42 on opposite interior walls 46 of the cage 34. Inwardly facing U-channel guides 41a, 41b can be attached to the plates by welding or by mechanical fasting means (not shown). FIG. 5 illustrates separate upper (41a) and lower (41b) U-channel guides at each edge of substrate panels 44, however, one contemplated variation provides for a single and longer U-channel guide extending along at least a major portion of each edge, represented by the dashed lines 41c. This single and long U-channel guide configuration facilitates the insertion of the substrate panel in that the assembler needs only to feed each edge of the panel into one guide. The width 45 of the U-channel is selected to be slightly greater than the thickness of panel 44. A rectangular substrate panel can be cut to a width slightly smaller than the distance d between opposite channel guides. Thus, the edges of the panel can slidably engage the channels for mounting within the cage. Stop blocks 47 (one shown) can be installed below the substrate panel to provide passageways for the animals to travel from one side of the panel to the other. Similarly, the substrate panel can be cut short of the top of the cage to provide additional water circulation.

Figure 6:
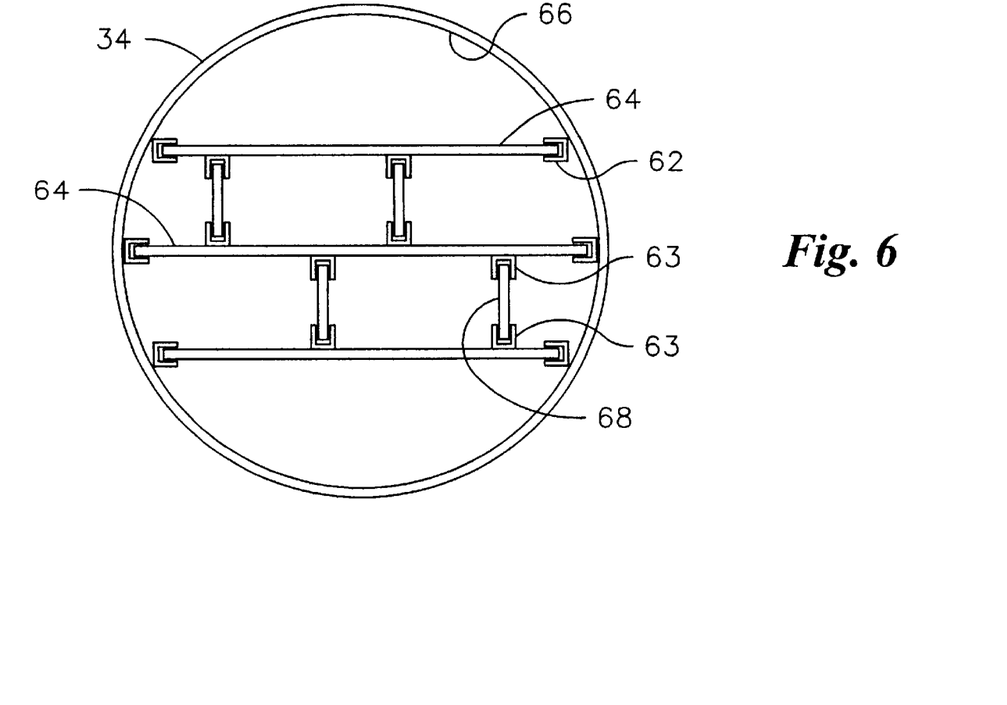
FIG. 6 is a diagram of the substrate configuration of another preferred rearing unit according to this invention.

FIG. 6 diagrammatically illustrates the top view of another preferred embodiment of substrate configuration in a cylindrical cage. Centrally facing pairs of U-channel guides 62 are mounted on the internal walls 66 of cage 34 by fastening means not shown. U-channel guides 62 are adapted to slidably engage vertically oriented substrate panels 64. Additional facing pairs of U-channel guides 63 are mounted vertically on neighboring substrate panels 64. The panel-mounted guides are adapted to receive spreader struts 68 perpendicular to the planes of the substrate panels. The spreader struts provide structural strength to the substrate panels. Therefore, at least one, and preferably more than one spreader strut should be mounted intermediate the edges of wide substrate panels. The struts also serve in part to block sunlight to darken the growing environment interior of the rearing unit which abalone prefer. Spreader struts can be of an engineering material solely to buttress the substrate panels 64. The spreader struts also can be of substrate material, e.g., cementitious backer unit material, which provides increased surface area for cultivation as well as improving structural integrity. In FIG. 6, three parallel substrate panels are shown. More panels and struts can be added to more optimally fill the cage so as to provide a maximum substrate surface per unit volume. Generally, the distance between struts or between struts and the internal wall 66 should be about 3 to 9 times the nominal height of the stock. This spacing provides room for animals to crawl around freely and for individuals on opposite facing substrate walls to crawl past each other. One of ordinary skill in the art will be able to define optimum panel and strut spacing without undue experimentation.

Figure 11:
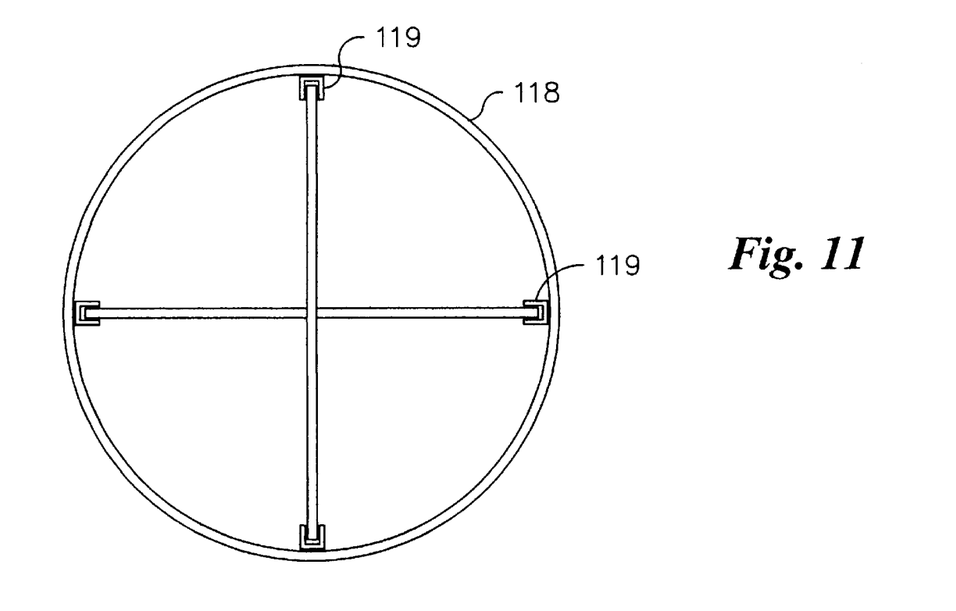
FIG. 11 is a top view of a preferred embodiment of a rearing unit according to the present invention.
Figure 12:
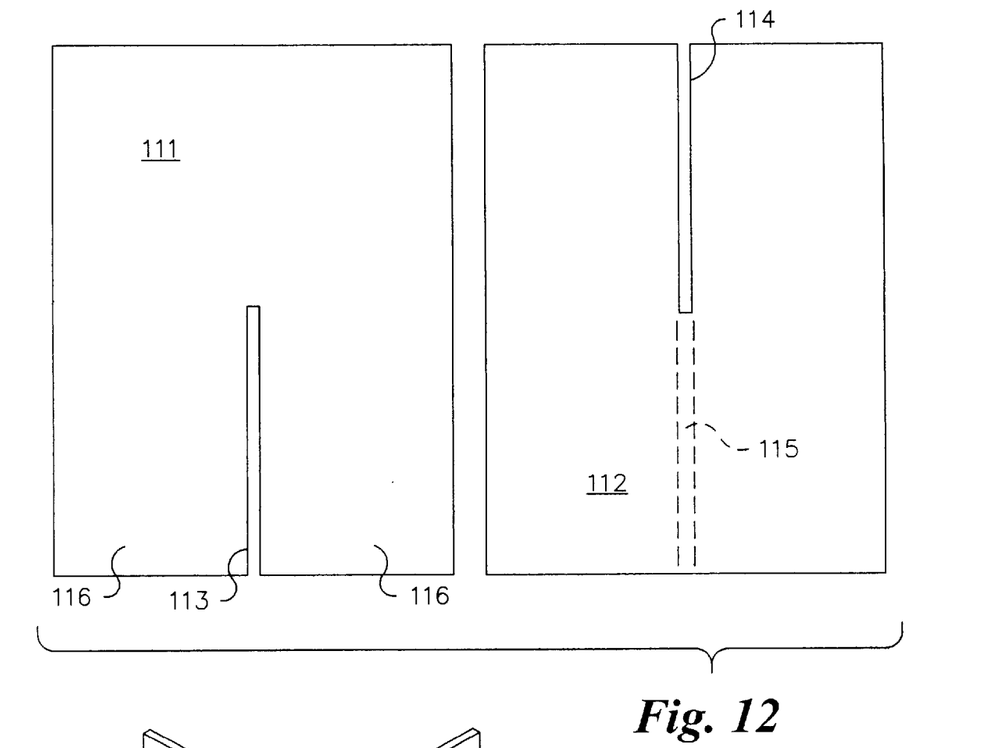
FIG. 12 is an elevation view of mating substrate panels that can be assembled for installation in a cage as shown in FIG. 11.
Figure 13:
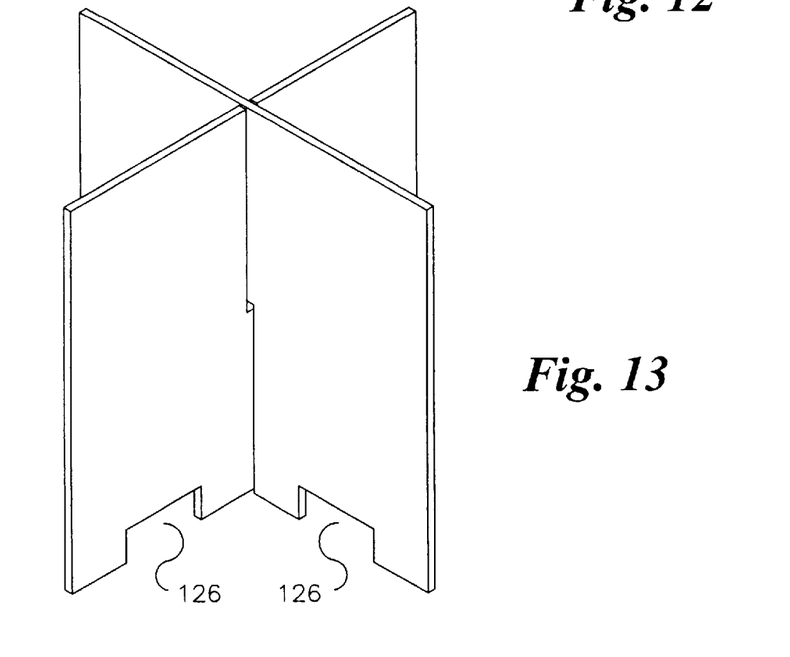
FIG. 13 is a perspective view of assembled mating substrate panels of FIG. 12 prior to installation in the rearing unit shown in FIG. 11.

Still another preferred embodiment of substrate panels is illustrated in FIGS. 11–13. In basic form, two rectangular substrate sheets 111, 112 each are cut to produce a narrow vertical slot 113, 114 located about midway between the side edges of the panel and which extend into the panel from the bottom and top edges of the panel, respectively, for a distance of about half the panel height. The width of the slot is slightly larger than the thickness of the other panel to allow the panels to interlock each other. The minimum panel thickness is not critical provided that the panels are thick enough to be self supporting and to support the weight of the cultivated marine animals under water. The panels in a single rearing unit can be of different thicknesses but preferably the thicknesses of all panels will be about the same. As juxtaposed in FIG. 12, panel 111 differs from panel 112 in that the slot extends into the panel from opposite edges. It should be evident that the two panels shown can be geometrically identical but that one is rotated 180 degrees about an axis perpendicular to the plane of the panel prior to assembly.

The panels are assembled by aligning the slots toward each other and inserting one panel into the other so that the bridge portion 115 between leg portions 116 of one panel interlocks with the slot of the other panel. When assembled, the planes of the two panels will be approximately perpendicular to each other. The assembled panels (FIG. 13) can then be installed in a cage 118 which has been equipped with pairs of oppositely facing U-shaped channel guides 119 mounted inside the cage, as previously described. The assembly can be installed in the cage as a unit or the panels can be installed sequentially. That is, the first panel is lowered into the cage with its side edges interlocking the U-shaped channel guides and the slot facing up, and then the second panel is lowered onto the first with the slot of the second panel facing down and the side edges interlocking a different U-shaped channel guide pair.

In more complex forms, more than two panels can be deployed in a cage. In that case, the panels will have multiple slots adapted to mate with corresponding panels to form a "tic-tac-toe" arrangement. For example, a four panel arrangement in which each panel has two slots can be envisioned. Such a four pane/two slot configuration produces a 3-by-3 matrix of a total of 9 compartments for growing the animals. Furthermore, the number of interlocking panels in one direction need not be the same as the number in the right angle direction. That is, a single central panel with two slots can mate with two other single slot panels to produce 6 growing compartments. If desired to allow movement of the animals and water between compartments, the interlocking panels can be set on blocks or can have cut outs 126. Optionally, cut outs 126 can be placed at the top or side edges of the panels or at a combination of top, side and bottom edges.

The panels can have optional holes for engagement by lifting equipment, not shown, such as hooks or cables hung from a manual or power-operated crane. Thus the panels can be easily gripped and lifted from the cage for cleaning, repair or other reason.

The row members are designed to provide certain desirable physical properties. Firstly, they are more buoyant than the maximum negative buoyancy of the rearing units laden with animals and food suspended therefrom. Thus the row member floats at the water surface and allows the rearing units to hang without contacting the waterfloor. The row members also should be sufficiently rigid to provide an effective amount of longitudinal compressive and tensile strength to keep neighboring columns a substantially uniform distance from each other. Still further the row members have structural integrity which enables a module to be disconnected from the columns and hoisted as a unit from the water with all rearing units connected.

The row members, and optionally the column members, can be made from a variety of strong, rigid, and buoyant elongated articles such as sealed, gas- or foam-filled metal cylinders and wooden logs. It has been discovered, however, that a basically composite construction of corrugated tubular culvert pipe containing a core of substantially incompressible, buoyant foam provides an ideal combination of properties for this utility. Corrugated culvert pipe may be metal or even concrete, but plastic is preferred. Plastic is light, inexpensive, does not corrode upon exposure to seawater and is impact resistant. The plastic can be of various types such as polyester, polyamide, polyolefin and blends of polymers. Low density polymers that are lighter than water are preferred. Olefin polymers, such as polyethylene, polypropylene and polybutylene are especially preferred and particular preference is given to polypropylene. The polymer composition of the plastic in the culvert pipe can contain additives for numerous purposes, such as fillers and plasticizers for strength and resilience, and pigments and/or antioxidants for photooxidative stability. The latter can be quite important in view that the floating culvert pipe remains exposed to sunlight for long periods.

Cross sectional shape of the culvert pipe is not critical, however, circular cross section is preferred. Straight wall, tubular pipe geometry is acceptable, but a corrugated profile provides additional significant advantages. For one, the corrugated grooves furnish convenient sites for mounting straps from which the rearing units can be suspended. For another, slings to deploy the modules as a unit, as is more filly explained below, can be adapted to engage the grooves thus providing a secure grip of the module.

Polypropylene corrugated culvert pipe suitable for use in this invention is typically commercially available in nominal diameter in the range of about 41 cm (16 inch) to about 91 cm (36 inch). Preferably, row and column member lengths are in the range of about 3.0 m (10 ft.) to about 6.1 m (20 ft.).

The substantially incompressible foam in the core of the culvert provides the bulk of the buoyancy and a significant stiffness to the member. The foam generally is a water resistant polymer composition. Preferred foam compositions include polystyrene, polyolefin, polyurethane, polyacrylate, polyester, polyacetal and mixtures of them. Polystyrene and polyolefin foam are more preferred. By "substantially incompressible" it is meant that the foam can withstand application of considerable compressive force without deflection. However, recognizing that the foam is constructed of vacant, thin-walled polymeric cells, the foam need not be perfectly rigid. The buoyant core can be foamed in place or the foam can be preformed in a generally cylindrical shape of suitable diameter, which is inserted and affixed within the culvert pipe. An advantage of foaming in place is that the foam grips the interior of the culvert corrugations making the culvert pipe/foam composite quite strong.

A preferred method of fabricating the buoyant members involves standing a preselected length of corrugated culvert pipe vertically on end. A length of tension member, such as chain can be hung centrally within the pipe so as to extend completely along the length of the pipe and beyond the pipe ends. A suitable foaming composition is poured into the pipe surrounding the chain and allowed to fill the interior. The module basically is ready for use after the foam sets. A preferred variation of this foamed-in place procedure results in a buoyant member illustrated in cross section in FIG. 3. The procedure additionally includes inserting a small diameter, smooth walled, rigid plastic tube, 43 such as about 5–7.5 cm diameter polyvinyl chloride ("PVC") sanitary water pipe, inside the corrugated culvert pipe 48 in stead of hanging a chain. The smooth walled pipe is disposed centrally within the corrugated culvert pipe such that the longitudinal axes coincide. This forms an annular cavity between the smooth pipe and the culvert pipe which is filled with foam 49. After the foam sets, the smooth walled pipe remains permanently in place. Chain or cable 50 is then run through the bore 51 of the smooth walled pipe which serves to protect the foam from chafing by the chain during motion when the buoyant member is deployed.

Figure 7:
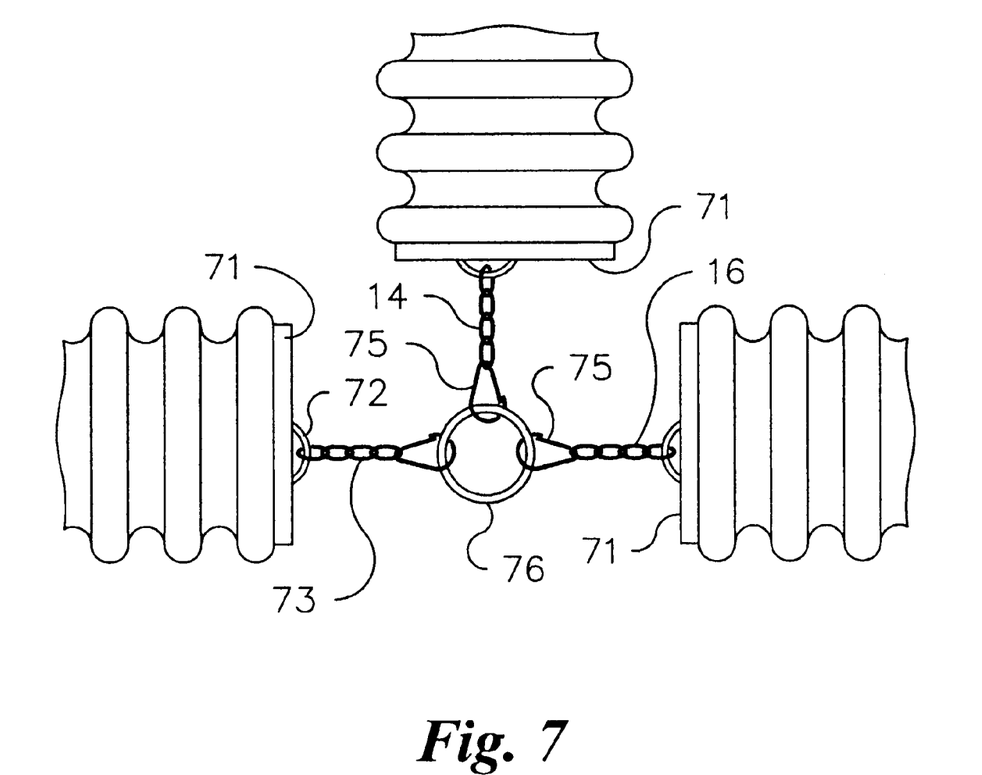
FIG. 7 is a detail of the row link and column link connection indicated in FIG. 2.

As seen in FIG. 7, another method of completing construction of the row and column members involves installing water tight caps 71 at both ends of each member. The outer face of the cap can include an eye 72 fitting to which a length of chain, cable or like tension member 73 can be attached to form the row links 14 and column links 16. Termini of tension members 73 can be shackled to attach the links to a ring 76. Snap shackles 75 are illustrated as representative of shackle means. Snap shackles permit rapid disconnection of the links from the linkage point.

Many variations for connecting the row and column members are contemplated to come within the scope of this invention. For example, the snap shackles can be replaced by screw- or pin-type shackles. Another preferred embodiment of the means for connecting rows and columns is the strap connector illustrated in FIGS. 8 and 8a. Flexible straps 82 of rope, ribbon, cable, chain and like materials, are tightly cinched about the row or column member 84 within a valley 86 between corrugations close to the end of the member. The strap is cinched at point 88 then led by link 85 to a terminal shackle means such as a snap hook 83. The terminal shackle means can be connected to a ring 89 or to other common shackling means for connecting row and column links, as previously described. The strap connector means for connecting corrugated walled members provides the advantage that connections can be made any point along the length of the corrugated member. This aspect is featured in FIG. 10 which shows row members 102 connected to column members 111 at positions intermediate the ends of the column members. Also neighboring row and column units are connected with intercolumn links 109 disposed along the lengths of column members 111. This is accomplished by using a strap connector cinched around the column members and lead in a direction perpendicular to the longitudinal axis of the column member.

In use the floating aquaculture apparatus generally is operated as follows: A row and column network structure adapted to suit to the geography of a preselected body of water is laid out and the columns are anchored in position, substantially as depicted in FIG. 2, for example. Elongated modules comprising row members of corrugated floating foam-filled polypropylene corrugated culvert pipe and multiple rearing units comprising 0.21 m$^3$ (55 gal) polypropylene drums hung from the row members by suspension assemblies are prepared. The row and column members are constructed of foam filled polypropylene corrugated culvert pipe. The rearing units are approximately equally spaced apart along the length of the row members. Walls of the rearing units are perforated for water exchange with the environment. The cage of the rearing unit is equipped with a plurality of vertically oriented sheets of cementitious backer unit panels. The panels are slid into U-shaped guides for example, as shown in FIG. 4. A stock of juvenile abalone at a preselected stage of maturity and an initial charge of food is carefully placed in the cage and the drum lid is secured in place to close the rearing unit.

The modules are then deployed between the columns. Two or more sling straps can be passed under each row member such that each sling strap fits into a corrugation valley. If only two sling straps are used, they are located near the ends of the row member and outboard of the end most suspension assemblies. A crane is employed to hoist the slings simultaneously thereby lifting the fully assembled elongated module into a vacant row position between adjacent columns.

Figure 8:
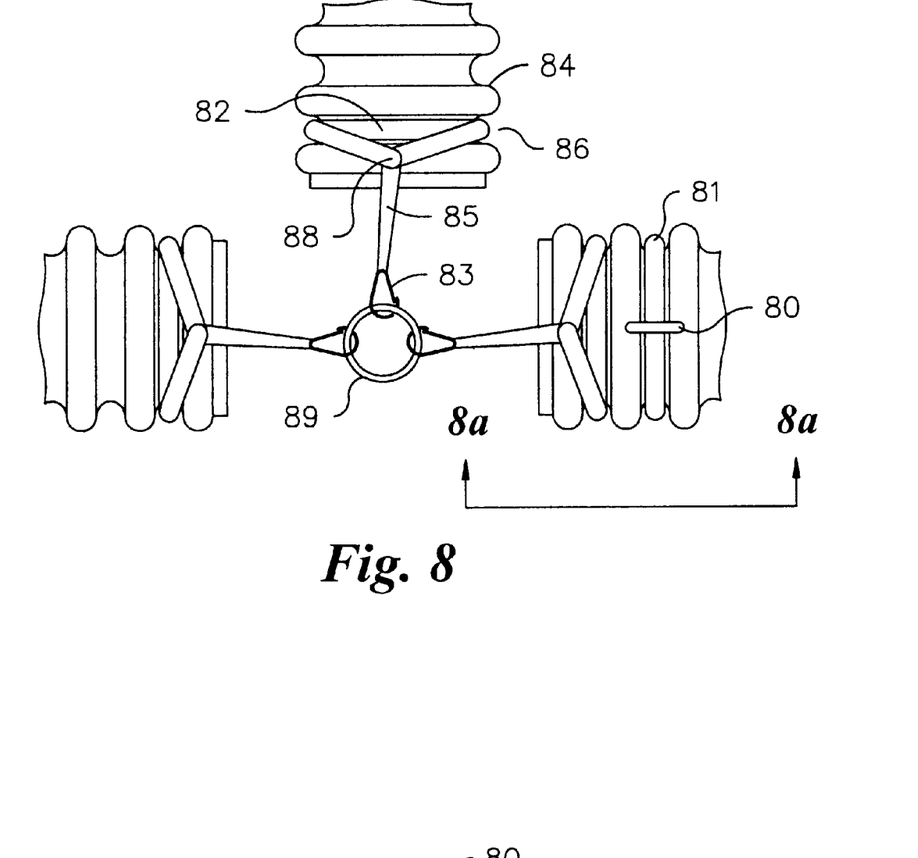
FIG. 8 is a detail of a strap mechanism for making the row link and column link connection shown in FIG. 2.
Figure 8A:
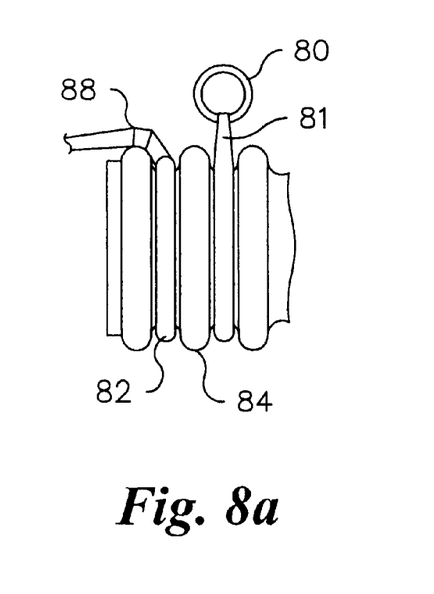
FIG. 8a is an elevation view from line 8a—8a in FIG. 8.

In another preferred embodiment, the row members can be hoisted by a plurality of hoisting eyes 80 secured to the row members by hoisting cinches 81, as seen in FIGS. 8 and 8a. The hoisting eye can be made to ride atop the row member. Thus, the hoisting cinch and eye device permits the row member to be lift the eye wit out of position by engaging the eye with a conventional hook suspended from the crane instead of passing a sling strap under the row member. This advantageously avoids the need to thread the sling strap below the row member and under water when removing the row member for service.

The elongated module is carefully lowered which causes the rearing units to submerge with the row member floating at the water surface. Row links are established with snap shackles at both ends of the row member to maintain the row member in position. The sling straps and crane are moved away. Other elongated modules are added successively to build up the row and column structure. The abalone placed in each rearing unit is classified to a preselected stage of development. The abalone are allowed to grow in the rearing units.

Periodically, each elongated module is serviced as follows: The row links are disconnected and the elongated module is hoisted from the structure with slings and crane as previously described. The rearing units are set down on a platform. The lids are removed, condition of the animals is monitored, if necessary, cleaning is done and any necessary repairs are made to the substrate, the animals are sorted harvested and restocked as appropriate, and food supply is replenished. When all rearing units connected to single row member are completely serviced, elongated module is placed in position within the floating aquaculture apparatus by hoisting with slings and crane.

Although specific forms of the invention have been selected for illustration in the drawings and the preceding description is drawn in specific terms for the purpose of describing these forms of the invention, this description is not intended to limit the scope of the invention which is defined in the claims.

What is claimed is:

1. A floating aquaculture apparatus for deployment in a body of water comprising
   (a) a plurality of substantially parallel columns including multiple buoyant elongated column members connected head-to-tail which comprise a tube having a corrugated wall profile along each member length and an incompressible buoyant material within the tube;
   (b) a plurality of elongated modules between adjacent columns spaced apart longitudinally along the columns and oriented substantially perpendicular thereto, each module including:
      (1) a buoyant elongated row member having a member length;
      (2) means for releasably attaching the row member at each of its two ends to the adjacent columns; and
      (3) at least one negatively-buoyant rearing unit adapted to contain marine animals, the rearing units being suspended from the row member operatively to submerge the rearing unit above the waterfloor; and
   (c) means for anchoring the apparatus to the waterfloor.

2. The invention of claim 1 wherein more than one negatively-buoyant rearing unit is suspended from the row member.

3. The invention of claim 2 wherein the row member includes a tube having a corrugated-wall profile along the member length and an incompressible buoyant material within the tube.

4. The invention of claim 3 wherein the row member includes
   (i) a tube of circular cross section, corrugated culvert pipe;
   (ii) an incompressible, buoyant polymer foam substantially filling the corrugated culvert pipe; and
   (iii) a metal chain extending beyond the member length centrally disposed within the culvert pipe and embedded within the polymer foam.

5. The invention of claim 4 wherein the culvert pipe is polypropylene.

6. The invention of claim 4 wherein the polymer foam is of a polymer selected from the group consisting of polystyrene, polyolefin, polyurethane, polyacrylate, polyester, polyamide, polyacetal and a mixture of them.

7. The invention of claim 4 wherein the polymer foam is polystyrene and wherein the culvert pipe is polypropylene.

8. The invention of claim 3 wherein the row member includes
   (i) a tube of circular cross section, corrugated culvert pipe;
   (ii) a wear-resistant hollow chain pipe extending along the member length within the culvert pipe to define an annular space external to the hollow chain pipe; and
   (iii) an incompressible buoyant material of polymer foam substantially filling the annular space.

9. The invention of claim 8 wherein the row member further comprises metal chain threaded through the chain pipe, each end of the chain being releasably attached to the adjacent columns along the length of the columns.

10. The invention of claim 3 wherein the row member comprises a section of corrugated culvert pipe, a water tight cap attached to each end of the culvert pipe, an eye on the exterior of each cap and a tension member connected to each eye.

11. The invention of claim 3 wherein the row member further comprises at least one flexible strap tightly cinched about the row member in a valley of the corrugated wall profile, the strap having a link leading to a terminal shackle means for connecting the strap to another row or column member.

12. The invention of claim 3 wherein the row member further comprises at least one hoisting eye affixed by a hoisting cinch about the row member in a valley of the corrugated wall profile.

13. The invention of claim 1 wherein the rearing units include a rigid cage with exterior walls having openings adapted to permit transfer of water between the cage and the body of water while confining the marine animals within the cage; an access hatch in a top wall of the cage; and at least one removable piece of habitat substrate.

14. The invention of claim 13 wherein the piece of habitat substrate is a sheet mounted in a substantially vertical plane orientation within the cage.

15. The invention of claim 14 wherein the cage further includes slidable mounting means for inserting and removing the sheet.

16. The invention of claim 13 wherein the habitat substrate is of a gastropod-compatible material selected from the group consisting of slate, rock, concrete slab, cementitious backer unit, fiberglass and a mixture of them.

17. The invention of claim 16 wherein the habitat substrate is cementitious backer unit.

18. The invention of claim 13 wherein the at least one piece of habitat substrate includes a plurality of rectangular substrate panels having at least one narrow vertical slot located between side edges of the panel, wherein the vertical slot extends inward from an edge of the panel, said substrate panels being assembled in a structure wherein a bridge portion between leg portions on opposite sides of the slot of one panel interlocks with a slot of another panel.

19. The apparatus of claim 1 which comprises at least four parallel columns arranged in column pairs having the modules disposed between column pairs and in which adjacent column pairs are positioned apart in a direction perpendicular to the columns.

20. The apparatus of claim 19 further comprising cross linking means between adjacent column pairs for maintaining relative lateral position of the column pairs.

21. The apparatus of claim 20 in which the parallel columns are formed from multiple buoyant elongated column members connected head-to-tail and the cross linking means are positioned at points intermediate the ends of the column members.

22. The apparatus of claim 1 in which the column members further comprise at least one flexible strap tightly cinched about a column member in a valley of the corrugated wall profile, the strap having a link leading to a terminal shackle means for connecting the strap to another column or row member.

23. A floating aquaculture apparatus for deployment in a body of water comprising
 (a) two substantially parallel columns of multiple buoyant elongated column members connected head-to-tail, the column members including corrugated culvert pipe and a first incompressible polymer foam within the culvert pipe;
 (b) a plurality of elongated modules between the two columns spaced apart longitudinally along the columns and oriented substantially perpendicular thereto, each module including:
  (1) a buoyant elongated row member having a member length and being releasably attached at each of two ends to the two columns, the row member including
   (i) a tube of circular cross section, corrugated culvert pipe;
   (ii) a second incompressible, buoyant polymer foam substantially filling the corrugated culvert pipe; and
   (iii) a metal chain extending beyond the member length centrally disposed within the culvert pipe and embedded within the polymer foam;
  (2) a plurality of negatively-buoyant rearing units adapted to contain marine animals, the rearing units being suspended from the row member operatively to submerge the rearing units above the waterfloor; and
 (c) means for anchoring the apparatus to the waterfloor.

24. The invention of claim 23 wherein the column member corrugated culvert pipe of composition including polypropylene and is about 3–6.1 m long and about 41–91 cm outer diameter.

25. The invention of claim 24 wherein the row member corrugated culvert pipe of composition including polypropylene and is about 3–6.1 m long and about 41–91 cm outer diameter.

26. The invention of claim 25 wherein the first incompressible foam and the second incompressible foams are of polystyrene.

27. A method of growing marine animals comprising placing a stock of juvenile animals of preselected maturity in a rearing unit of a floating aquaculture apparatus including
 (a) a plurality of substantially parallel columns;
 (b) a plurality of elongated modules between adjacent columns spaced apart longitudinally along the columns and oriented substantially perpendicular thereto, each module including:
  (1) a buoyant elongated row member having a member length and being releasably attached at each of its two ends to the adjacent columns; and
  (2) at least one negatively-buoyant rearing unit adapted to contain marine animals, the rearing unit being suspended from the row member operatively to submerge the rearing unit above the waterfloor;
 (c) means for anchoring the apparatus to the waterfloor;
 using the floating aquaculture apparatus to deploy the rearing unit containing the stock of juvenile animals below the surface of water in a natural environment for the animals;
 removing from the apparatus a module comprising a row member with suspended rearing units attached thereto;
 servicing the module; and
 replacing in the apparatus the module comprising a row member with suspended rearing units attached thereto.

28. The method of claim 27 in which the module includes more than one rearing unit suspended from the row member, and in which the removing and replacing steps include hoisting the module with the rearing unit suspended from the row member.

29. The method of claim 28 in which the row member includes a tube having a corrugated wall profile along the member length and an incompressible buoyant material within the tube.

30. The method of claim 29 wherein the marine animals are abalone.

31. The method of claim 29 wherein the rearing unit includes at least one removable piece of habitat substrate comprising cementitious backer unit.

32. The method of claim 29 in which the hoisting step includes lifting the module by at least two straps slung under the row member in valleys of the corrugated wall profile.

33. The method of claim 29 wherein the row member further comprises at least one hoisting eye affixed by a hoisting cinch about the row member in a valley of the corrugated wall profile and in which the hoisting step includes lifting the module with a hook engaging the hoisting eye.

34. The method of claim 27 in which the columns comprise multiple buoyant column members connected head-to-tail which comprise a tube having a corrugated wall profile along each member length and an incompressible buoyant material within the tube.

35. A floating aquaculture apparatus for deployment in a body of water comprising
   (a) a plurality of substantially parallel columns;
   (b) a plurality of elongated modules between adjacent columns spaced apart longitudinally along the columns and oriented substantially perpendicular thereto, each module including:
      (1) a buoyant elongated row member having a member length;
      (2) means for releasably attaching the row member at each of its two ends to the adjacent columns; and
      (3) a plurality of negatively-buoyant rearing units adapted to contain marine animals, the rearing units being suspended from the row member below the water surface and above the waterfloor,
   wherein the row member includes a tube having a corrugated-wall profile along the member length and an incompressible buoyant material within the tube; and
   (c) means for anchoring the apparatus to the waterfloor.

36. The apparatus of claim 35 wherein the row member further comprises at least one flexible strap tightly cinched about the row member in a valley of the corrugated wall profile, the strap having a link leading to a terminal shackle means for connecting the strap to another row or column member.

37. The apparatus of claim 35 wherein the row member further comprises at least one hoisting eye affixed by a hoisting cinch about the row member in a valley of the corrugated wall profile.

* * * * *